(12) United States Patent
Cantolino

(10) Patent No.: US 11,749,478 B1
(45) Date of Patent: Sep. 5, 2023

(54) MAGNETIC LATCHING FLOAT SWITCH

(71) Applicant: DiversiTech Corporation, Duluth, GA (US)

(72) Inventor: Christopher Cantolino, Bradenton, FL (US)

(73) Assignee: DiversiTech Corporation, Duluth, GA (US)

( * ) Notice: Subject to any disclaimer, the term of this patent is extended or adjusted under 35 U.S.C. 154(b) by 0 days.

(21) Appl. No.: 17/543,686

(22) Filed: Dec. 6, 2021

Related U.S. Application Data

(63) Continuation-in-part of application No. 16/873,260, filed on Mar. 6, 2020, now Pat. No. 11,322,323.

(60) Provisional application No. 62/856,620, filed on Jun. 3, 2019.

(51) Int. Cl.
*H01H 36/02* (2006.01)
*G05D 9/12* (2006.01)
*H01H 9/02* (2006.01)

(52) U.S. Cl.
CPC ............. *H01H 36/02* (2013.01); *G05D 9/12* (2013.01); *H01H 9/02* (2013.01)

(58) Field of Classification Search
CPC ............. H01H 36/02; H01H 9/02; G05D 9/12
See application file for complete search history.

(56) References Cited

U.S. PATENT DOCUMENTS

| | | | |
|---|---|---|---|
| 3,052,778 A | 9/1962 | Kathe | |
| 3,273,091 A * | 9/1966 | Wales, Jr. | .......... H01H 36/0073 336/DIG. 1 |
| 3,743,980 A | 7/1973 | Steiner | |
| 4,056,979 A * | 11/1977 | Bongort | .................. G01F 23/74 73/DIG. 5 |
| 4,489,297 A * | 12/1984 | Haydon | ............. H01H 36/0073 200/557 |
| 6,140,925 A * | 10/2000 | Lee | ......................... G01F 23/74 340/623 |

(Continued)

FOREIGN PATENT DOCUMENTS

WO     WO2006052250 A1     5/2006

*Primary Examiner* — Bernard Rojas
(74) *Attorney, Agent, or Firm* — Dentons US LLP

(57) ABSTRACT

A small compact magnetic latching shut-off switch having a lightweight float, angled geometry, and quick/convenient small-stroke manual float reset. A lower float magnet and a second upper magnet affecting electrical circuit continuity have initial offset positioning that minimizes their magnetic attraction to one another. When a predetermined small amount of fluid accumulates below it, the float begins forward rotation and attraction between magnets thereafter multiplies until gravitational force on the float and forces maintaining initial raised positioning of the upper magnet are overcome, resulting in strong latched snap-lock connection between upper and lower magnets, an abrupt/reliable/ strong tripped state that remains until manual float reset occurs. Transparent float housing reveals drain line clogging potential, and structural features of the float and housing enable raised tripping point adjustment, promoting switch reliability. Switch use with a tapered threaded adapter seal also provides fast and stable installation, and greater adaptation to different work environments.

24 Claims, 7 Drawing Sheets

(56) References Cited

U.S. PATENT DOCUMENTS

| | | | |
|---|---|---|---|
| 6,442,955 B1 * | 9/2002 | Oakner | H01H 36/02 340/618 |
| 6,550,264 B1 | 4/2003 | Cantolino | |
| 6,895,771 B1 | 5/2005 | Cantolino | |
| 6,992,259 B1 | 1/2006 | Cantolino | |
| 6,992,260 B1 | 1/2006 | Cantolino | |
| 7,067,750 B1 * | 6/2006 | Cantolino | H01H 35/18 200/84 R |
| D527,793 S | 9/2006 | Cantolino | |
| D562,963 S | 2/2008 | Cantolino | |
| 7,334,421 B1 | 2/2008 | Cantolino | |
| 7,389,651 B2 | 6/2008 | Cantolino | |
| 7,637,387 B1 | 12/2009 | Cantolino | |
| 7,673,646 B1 | 3/2010 | Cantolino | |
| 7,710,283 B1 * | 5/2010 | Cantolino | B60H 1/3225 340/623 |
| 7,744,395 B1 | 6/2010 | Cantolino | |
| D630,709 S | 1/2011 | Cantolino | |
| 7,878,019 B2 | 2/2011 | Cantolino | |
| 7,896,301 B1 | 3/2011 | Cantolino | |
| 7,900,795 B1 | 3/2011 | Cantolino | |
| 7,967,267 B1 * | 6/2011 | Cantolino | F24F 13/222 248/231.61 |
| 8,100,140 B1 | 1/2012 | Cantolino | |
| 8,151,621 B1 | 4/2012 | Cantolino | |
| 8,154,313 B1 | 4/2012 | Cantolino | |
| 8,169,314 B2 | 5/2012 | Cantolino | |
| 8,220,768 B1 | 7/2012 | Cantolino | |
| 8,317,169 B1 | 11/2012 | Cantolino | |
| 8,319,626 B1 | 11/2012 | Cantolino | |
| 8,461,493 B1 | 6/2013 | Cantolino | |
| 8,561,417 B1 | 10/2013 | Cantolino | |
| 8,578,770 B2 | 11/2013 | Cantolino | |
| 8,844,353 B2 * | 9/2014 | Hsiao | H01H 35/18 73/317 |
| 8,973,437 B2 | 3/2015 | Cantolino | |
| 9,038,405 B2 | 5/2015 | Cantolino | |
| 9,105,175 B1 | 8/2015 | Cantolino | |
| 9,249,981 B2 * | 2/2016 | Sada | F24F 11/52 |
| 9,503,015 B2 | 11/2016 | Cantolino | |
| 11,322,323 B1 * | 5/2022 | Cantolino | H01H 36/0073 |
| 2005/0166613 A1 * | 8/2005 | Oakner | F24F 13/222 62/150 |
| 2006/0042918 A1 | 3/2006 | Cantolino | |
| 2006/0222508 A1 | 10/2006 | Cantolino | |
| 2011/0181380 A1 * | 7/2011 | Iwata | H01H 23/168 335/63 |
| 2012/0053736 A1 | 3/2012 | Cantolino | |
| 2012/0219428 A1 | 8/2012 | Cantolino | |
| 2014/0008253 A1 | 1/2014 | Cantolino | |
| 2014/0102123 A1 | 4/2014 | Cantolino | |
| 2015/0000193 A1 | 1/2015 | Cantolino | |
| 2015/0082697 A1 | 3/2015 | Cantolino | |

* cited by examiner

MAGNETIC LATCHING FLOAT SWITCH

CROSS-REFERENCES TO RELATED APPLICATIONS

This patent application is a Continuation-In-Part of U.S. utility patent application Ser. No. 16/873,260 filed Mar. 6, 2020, now U.S. Pat. No. 11,322,323 issued 3 May 2022, which claims a benefit of priority to U.S. provisional patent application 62/856,620, filed Jun. 3, 2019, each of which is herein incorporated by reference in its entirety for all purposes. The utility patent application herein discloses a Magnetic Latching Float Switch and a Magnetic Switch Assembly comprising a toggle bar with a first magnet associated with one of its ends and a switch actuator with a second magnet, the toggle bar and switch actuator each are rotatable between individual first and second positions, wherein magnetic fields of the two magnets increasingly interact with one another as the switch actuator moves from its first position, and when the switch actuator reaches its second (tripped) position, the greatly increased attraction between the two magnets causes the toggle bar to pivot abruptly from its first position to its second position, promptly and definitively interrupting an electrical circuit established between a power source and electrical load without jitter, chatter, or intermittent switching. Manually returning the switch actuator to its first position allows the toggle bar to also return to its first position, optionally assisted by a pull piece to bias the toggle bar and magnet in the first position. Thus, the switch can be easily reset for additional use. The present invention herein also uses increasing magnetic attraction between two magnets to abruptly interrupt an electrical circuit, one magnet supported by a pivoting toggle bar movable within an upper cap, and the other magnet supported by a switch actuator in the form of a float with angled geometry that is also connected to the cap, but rotates within a lower housing configured and positioned to collect a small amount of fluid in a reservoir beneath the float. Although contact with fluid having a predetermined depth does initiate the float's rotation toward a raised tripping point, it is the increasingly strong attraction of the two magnets to one another as the distance between them decreases, that subsequently leads to and causes the abrupt latching action between them, wherein prompt shut-off of an associated fluid-producing system is accomplished without jitter, chatter, or intermittent switching. The two magnets remain locked together until float positioning is manually reset via a short-stroke pin assembly. In the alternative, separation of upper cap and lower housing can allow direct access to the float for manually moving it back into its initial position where magnetic attraction between the float magnet and the bar magnet is minimal until a small amount of fluid accumulating in the lower housing rotates the float a slight amount, which starts the increase in magnetic attraction between the two magnets to build again to a point where abrupt shut-off of the associated fluid producing system will occur.

BACKGROUND OF THE INVENTION—FIELD OF THE INVENTION

Float switches are known for shutting off fluid-producing systems when continued fluid production is likely cause damage to the system itself or surroundings, yet most prior art float switches need more fluid accumulation to reach a tripped position than is needed during present invention use, and are also configured for automatic reset when the threshold amount of fluid needed to raise the float is no longer present. However, installation sites often subject float switches to debris and mold/algae/yeast that can build up and lead to premature switch failure, including failure due to intermittent switching that can cause electrical contacts to become welded together as a result of in-rush current. Through a combination of its unique structural features, the compact and adjustable present invention overcomes problems currently known in the prior art, and also provides some new advantages, wherein after its angled float geometry encounters a predetermined low amount of fluid accumulation in its lower housing, that calculated threshold amount of fluid initiates a slight rotation of the float toward its tripped position, wherein additional float movement toward the tripped position is the result of increasing magnetic attraction of a float-supported magnet to a toggle-supported magnet located in an upper cap positioned above the lower housing (and from which the float magnet was initially offset to minimize magnetic attraction), with the float steadily decreasing distance toward the toggle magnet until reaching its predetermined raised tripping point goal where the toggle magnet is rapidly drawn downward by the float magnet and causes both magnets to quickly and strongly latch together via abrupt snapping action, and thereafter retaining the latched-together and locked positioning until manually reset. Although not limited in application to the following, a primary fluid-monitoring application contemplated for the present invention is in connection with a drain pan beneath the air handler of an air conditioning system, which collects moisture removed from circulating air, that moisture then being removed from the drain pan through a connected drain line to an exterior location. Particularly in hot and humid climates, air handler coils can breed mold, algae, yeast, and the like, which can then build up in the connected drain line and totally block fluid flow through it, with continued moisture removed from circulating air thereafter spilling from the drain pan into surrounding areas. While preventive maintenance for drain lines can be scheduled in advance and include a variety of procedures to chemically and/or physically remove a clog (or partial clog), including use of bleach, vinegar, a shop vac, and/or plumbing snake, other factors (such as long periods of hot/humid weather) can accelerate clog formation and create total blockage of a drain line sooner than expected. The unique geometry of the present invention allows a small, compact, and lightweight float to be reliable in causing abrupt and definitive interruption of an electrical circuit powering an air conditioning system to stop additional fluid production when a drain line blockage occurs, but further through use of a lower housing made from transparent materials, homeowners and service technicians can obtain instant and up-to-date information from the present invention about drain line clogging potential. Direct observation of float status (whether in its tripped state, or not) and the quantity of fluid present in the lower housing under the angled float, together allow an owner or service technician to accurately identify whether an air conditioning system drain line has good flow through it with little clogging potential (float is down/not tripped and no water is visible in the lower housing), has a small blockage and some clogging potential (float is down/not tripped but a little water is visible in the lower housing), has a large blockage requiring remedial action (float is up/tripped and a little water is visible in lower housing), or has total blockage 9 requiring immediate action (float is up/tripped and lower housing is full of water). When up-to-date information about drain line clogging potential is available to home owners and service technicians, impending issues can be resolved early, before damage to a fluid producing system or surroundings can occur.

The goal of the present invention is to place a small, reliable, and very lightweight float under the influence of magnetic attraction in a manner providing a trouble-free, reproducible, and strong snap-locking magnetic connection between two magnets, the fast and forceful latching together thereof dependably controlling the continuity of the electrical circuit connected to both the present invention switch and an associated fluid-producing system. The present invention achieves this goal through a multiplication of float performance-influencing factors created by various features incorporated into its structure, including angled float geometry, lower housing construction, float buoyancy, and float strength/positioning/orientation that in combination do not allow fluid to collect under the float in a quantity sufficient to rotate the float and allow rising fluid to be the dominant factor shutting off an associated fluid producing system. Instead, rising fluid only alters the float's lowered pre-tripped position and its spatial orientation to the small degree needed for increased alignment of magnets that allows magnetic attraction between toggle and float magnets to increase and conclude the tripping process with a fast and strong locking/latching together of opposing magnets. Another factor affecting present invention float movement is the angled configuration and proximity of lower housing structure adjacent to the float in its lowered pre-tripped position, which only permits one-way movement of the float from its lowered pre-tripped position to a point where attracting magnets are no longer substantially offset from one another and the magnetic attraction between the upper toggle magnet housed in the present invention's upper cap and the magnet associated with the float rotatable within the lower housing can build to ultimately achieve a quick and strong tripped/locked/latched connection to one another that definitively and reliably shuts off operation of an associated fluid-producing system. The multiplicity of present invention structural features working together is essential for producing the quick and reliable upward float rotation to its raised tripping point that leads to abrupt/snapped and strong latching of the opposed magnets together, causing a toggle bar supporting the upper magnet to promptly move from raised circuit-closed positioning to lowered circuit-open positioning (without chatter) to interrupt fluid production. The toggle bar and magnet arrangement preferably used in the present invention is housed within its upper cap and includes structure disclosed in U.S. patent application Ser. No. 16/873,260, filed on Mar. 6, 2020, by the same inventor herein under the title of Magnetic Switch Assembly. However, while the ferrous pin affecting upper magnet movement that is disclosed in U.S. patent application Ser. No. 16/873,260 may be used as a part of the present invention, and is present in at least one present invention illustration, a ferrous pin (or other pull piece made of material subject to magnetic attraction) is not a critical component to all present invention embodiments as other features (such as springs) may also help to bias upper magnet movement according to need for a contemplated application.

In summary, novelty in the present invention includes float rotating speed and trip point that are adjustable in multiple ways and according to need in differing applications, such as but not limited to the amount of off-center angle used in the float geometry, the amount of forward float angle used relative to its vertical positioning, lower housing configuration features that affect float rotation and allow only forward float movement, float buoyancy, and the size, weight, and positioning of opposed magnets used to raise the float sufficiently to cause movement of the upper magnet into its second position and the fast-snapping tripping movement that abruptly locks the two magnets strongly together, until manual float reset, with or without use of a ferrous pin (or other pull piece) affecting toggle bar bias and pivot speed. Initially, the rotating float supports the lower magnet in an offset position that minimizes its attraction to the toggle bar magnet. However, when the float encounters fluid, it begins forward movement from its lowered pre-tripped position until sufficient magnetic attraction occurs, and then multiplies and builds, to cause it to reach a target raised tripping point where the toggle bar magnet quickly and sharply moves toward the float magnet and causes them to snap abruptly together and shut off an associated fluid-producing system (and/or potentially achieve other desired activity, such as, but not limited to different types of notifications). The manner in which the forceful attraction exhibited between magnets in the present invention is multiplied by other structure, is not presently known in the prior art, and the stronger magnetic attraction created through such a multiplication of factors (and not simply the buoyancy of a lightweight float assembly) provides enhanced reliability over prior art fluid sensor devices for a trouble-free and reproducible/strong snap-locking action between the two magnets and reduced malfunction during long-term use. No prior art float switch is known to have the same structure and provide the same advantages and benefits as the present invention magnetic latching float switch assembly disclosed herein.

BACKGROUND OF THE INVENTION—DESCRIPTION OF THE RELATED ART

The inventions thought to be the closest to the present invention are those previously created by the inventor herein and currently protected by U.S. Pat. No. 7,710,283 B1 to Cantolino (May 4, 2010) and U.S. Design Pat. D527,793 to Cantolino (Sep. 5, 2006). Although the invention disclosed in U.S. Pat. No. 7,710,283 B1 discloses a fluid sensing device with a rotating float assembly supporting a magnet, and upward float movement latches the float-supported magnet to another magnet to open a circuit and shut off fluid production, the present invention's structure is distinguishable with an added lower housing that does not allow fluid to collect under the float in sufficient quantity to cause float elevation to a raised tripping point where fluid production is stopped. Instead, the present invention primarily relies on a strong, abrupt, and more reliable magnetically induced snapping action to stop fluid production with less fluid accumulation prior to fluid production shut-off. The present invention lower housing is also configured to block rearward float movement as fluid accumulation occurs. No similar lower housing structure is disclosed in U.S. Pat. No. 7,710,283. In addition, U.S. Design Pat. 527,793 contains illustrations of an adapter with an externally-threaded end, but it does not appear to have a tapered configuration, its gripping area is smaller and centrally located, and also the invention disclosed in U.S. Design Pat. 527,793 does not have or anticipate an indent to improve performance of an O-ring (or other seal) used in association with it during threaded connection to fluid transport tubing or a drain pan to prevent leaks and/or blowout should over-tightening of the threads occur during installation. Furthermore, although some of the structure disclosed in the present invention herein is also found in certain patented prior art devices of the inventor, such as magnets used to open a circuit through float movement and exterior threads on an adaptor, no such prior art inventions, alone or in combination with other inventions, anticipates the present invention, provides all of its benefits or advantages that are disclosed herein, or has motivation to teach the rapid and reliable snap-locking action of the magnetic latching float switch assembly disclosed herein.

SUMMARY OF THE INVENTION

The primary objective of this invention is to provide a reliable float switch assembly that forcefully and definitively affects the continuity of an electrical circuit without jitter, chatter, or intermittent switching, until manually reset for further use. Another objective is to provide a float switch assembly activated by strong magnetic attraction created through a multiplication of factors, and not simply the buoyancy of a lightweight float assembly, which confers enhanced reliability over prior art shut-off switches for a trouble-free and reproducible/strong snap-locking action between the two magnets when they are suddenly and forcefully brought together to create a tripped state, thereby also providing reduced malfunction during long-term use. In addition, it is also an object of this invention for the factors creating the strong magnetic attraction to be adjustable according to differing needs and applications. It is a further object of this invention to provide a float switch assembly that is easily installed, easily reset, has reliable operation for extended periods of time with little or no post-installation inspection or maintenance, and is easily tested at any time to ascertain proper working order. It is also an object of this invention to provide a float switch assembly that effectively operates when only a small predetermined threshold amount of fluid accumulation is present in its lower housing, and not primarily rely on rising fluid level for switch activation. In addition, it is an object of this invention to provide a float switch assembly with sturdy and rugged construction, as well as stable mounting so that little or no deviation from its originally installed position occurs during extended periods of use. It is also an object of this invention to provide a float switch assembly made from corrosion-resistant materials that resist premature deterioration and malfunction. A further object of this invention is to provide a float switch assembly made of materials able to reliably operate in temperature extremes. It is also an object of this invention for its upper cap and lower housing to have construction that protects its rotating float from airborne debris and does not permit sufficient fluid to collect under the float and thereafter cause intermittent switching that could damage an associated fluid-producing system. It is a further object of this invention for the upper cap and lower housing to have a press-fit connection with raised hinge slot snap-lock feature that provides firm connection during use, while also allowing easy separation of one from the other for float reset and inspection/maintenance purposes. An additional object of this invention when its lower housing is made from transparent materials is quick/direct conveyance of information (or a warning) to those servicing a fluid producing system about the existing clog potential of an associated drain line diverting excess fluid away from the system and its surroundings, so that when clogs do develop prompt diagnosis and remedial action can be taken to avoid damage.

This invention is a small and compact magnetic latching float switch assembly used to detect a predetermined threshold low level of fluid, and then promptly and definitively shut off an associated fluid-producing system, activate an alarm, and/or send a remote notification in response to that fluid detection when it exceeds that predetermined threshold amount confirmed to place the system and/or its surroundings at risk for damage. Circuit interruption results from a fast and firm one-way snap-lock latching of magnets together, without jitter or other intermittent switching, and after tripping occurs the magnets are always manually reset to their pre-tripped positions, preferably with a short-stroke action, such as through use of a reset pin assembly making contact with the float near its pivoting axis. However, float reset can also be directly accomplished after separation of the upper cap from the lower housing and rotation of the upper cap into a position where the float can be easily reached for manual reset. The float's rotating speed and raised tripping point are also adjustable via multiple factors, such as but not limited to the amount of off-center angle in the float geometry, the amount of forward float angle relative to a vertical positioning, float buoyancy, and the size, weight, and positioning of the opposed magnets used to create the accelerated magnetic attraction that rapidly raises the float to a raised tripping point and overcomes the forces holding the toggle magnet in its original raised position, thereafter causing the toggle magnet to rapidly drop in a downwardly direction until the fast-snapping latching connection of the two magnets firmly to one another occurs. In addition, although the most preferred embodiments of present invention magnetic latching float switch have a transparent lower housing through which a tripped float status is easily viewed, tripped status may also (or in the alternative) be indicated by a notification light, LED, or other indicator associated with an externally accessible and easily visible manual reset button. Another important feature of the present invention is an easily releasable press-fit hinge between its upper cap and lower housing that allows for easy removal of the upper cap for float inspection and easier lower housing removal when connected to fluid or condensate transport tubing via the threaded adapter seal disclosed herein or another easily-releasable extension/connector device, wherein easy rotation relative to the tubing to separate the lower housing in tight-fitting installation sites is possible. For added reliability and adaptability of use, the new threaded adapter seal disclosed herein allows a glued connection to the lower housing to satisfy building Codes related to air conditioning system use, while its threaded end offers a greater range of adaptation to different working environments. The angled geometry of its upper cap also accommodates tight-fitting installation of the present invention in small working environments, such as installation in close proximity to an air conditioning unit. The combination of advantages and benefits provided by the present invention herein are not known in the prior art.

COMPONENT LIST

1—Upper Cap of the most preferred embodiment of Magnetic Latching Float Switch 21 (is supported by Lower Housing 3 and rotatably connected to it by a Hinge Pin 4 connection 2—Reset Pin Assembly (creates a manually depressible short stroke into Upper Cap 1 to reset Float Assembly 9 after it has achieved tripped positioning)

3—Lower Housing (has a releasable connection with Upper Cap 1, bottom Fluid Collection Reservoir 16, a hollow interior closely sized for rotation of Float Assembly 9 and its connected Trip Indicator 12, a Float Stop 15 promoting only one-direction rotation of Float Assembly within Lower Housing 3, and an Open End 3A remote from Float Stop 15 and in fluid communication with Fluid Collection Reservoir 16)

Figure 3:
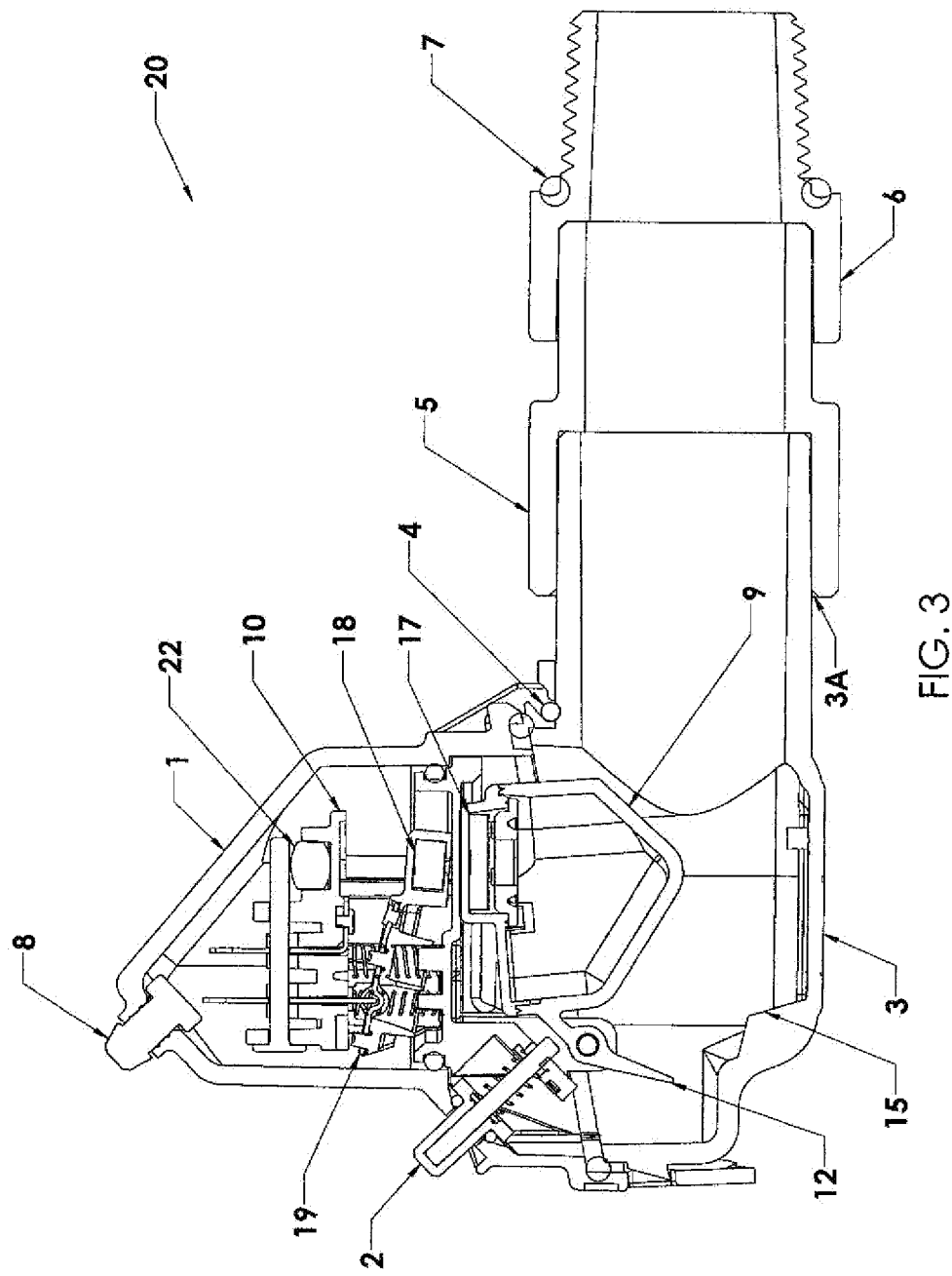
FIG. 3 is a side section view of the invention in FIGS. 1 and 2, and showing the first and second magnets each in their tripped positions and in strong snap-locked/latched relation with one another, with FIG. 3 also showing the interior portion of the reset pin assembly positioned within the lower housing close to the pivoting axis of the float and ready for manual float reset to its lowered pre-tripped position, a fluid-trapping reservoir in the bottom portion of the lower housing, a float stop feature of the lower housing positioned rearward from the float assembly that promotes only forward rotation of the float when in contact with a predetermined amount of accumulated fluid, a trip indicator movable with the float which undergoes an orientation change as the float moves between its first (reset) and final (tripped) positions so that it is visible and may be viewed through a window in the lift tab to confirm tripped float positioning to indicate "tripped" status of the float to an observer when the lower housing is transparent, and a switch assembly located in the upper cap that includes a toggle bar supporting a toggle magnet, and an optional biasing pull piece near the angled top of the upper cap that can be used to assist in maintaining the toggle magnet in its raised pre-tripped positioning until the strong snap-locked latching connection of magnets occurs as the toggle magnet snaps downwardly toward the float magnet remaining at its raised tripping point.

3A—Open End of Lower Housing 3 mated with Tubular Extension 5 and through which fluid (not shown) enters Lower Housing 3 to reach Fluid Collection Reservoir 16 [See FIG. 3]

4—Hinge Pin (pivotally connects Upper Cap 1 to Lower Housing 3, may be integral with Upper Cap 1, or a separate component)

5—Tubular Extension (optionally usable for connection of Lower Housing 3 to Threaded Adapter 6)

6—Threaded Adapter (used for quick release and secure leak-resistant reattachment of the most preferred embodiments of the Magnetic Latching Float Switch 21 disclosed herein in its installed position of use, preferably having tapered interior walls, as well as one of its opposed ends having tapered threads with a thread angle in the range of 1.75-4 degrees)

7—O-Ring and associated Indent [See FIGS. 2-5] (O-ring or equivalent sealing means is employed to seal Threaded Adapter 6 to fluid transport tubing or a drain pan opening (not shown) that is in fluid communication with a fluid-producing system, the tubing, drain pan, and fluid-producing system are not included as a part of the accompanying illustrations, with Indent 7 improving O-ring and other sealing means performance should overtightening of threads occur)

8—Strain Relief (used with Upper Cap 1 to support and stabilize electrical wiring connecting (not shown) Switch Assembly 10 to a fluid-producing system, or a shut-off control therefor, that stops additional fluid production 9—Float Assembly with angled construction (is rotationally connected to Upper Cap 1 for rotation within Lower Housing 3 during electrical circuit interruption use)

10—Switch Assembly [See FIG. 3] (located within Upper Cap 1 and includes Toggle Bar 19, Toggle Magnet 18, and an optional Pull Piece 22 that assists in maintaining Toggle Magnet 18 in its pre-tripped/raised positioning until latching connection of magnets takes place)

Figure 1:
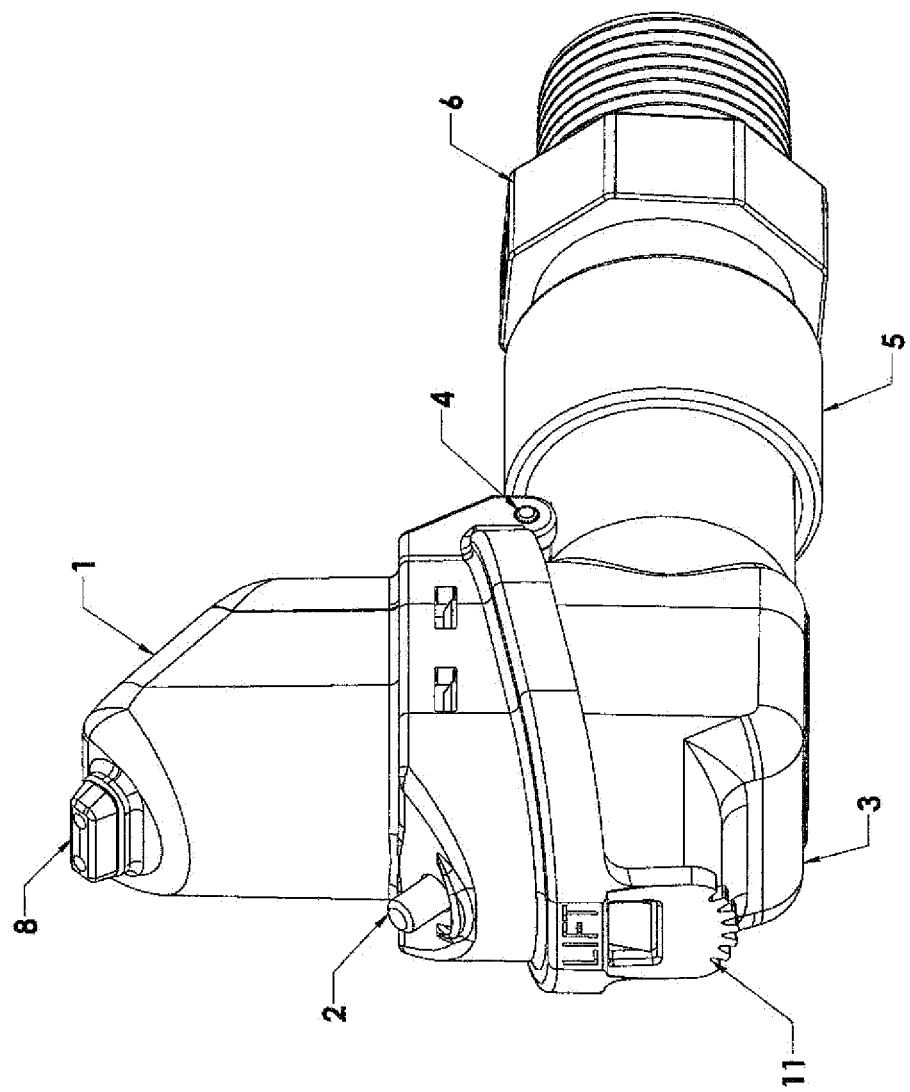
FIG. 1 is a perspective view from the back of the most preferred embodiment of the present invention magnetic latching float switch assembly showing the angled geometry of an upper cap supported by a lower housing and rotationally connected to the lower housing via a hinge pin, with FIG. 1 also showing a float reset pin assembly, a lift tab used to facilitate manual separation of the upper cap from the lower housing, a tubular extension in fluid communication with the lower housing, an externally-threaded adapter with a non-threaded gripping portion on one of its opposing ends secured to the tubular extension (the threaded end of the adapter available for connection to a drain pan opening in air conditioning system applications, not shown), and a strain relief through the top portion of the upper cap configured for supporting electrical wiring (not shown) needed for connection to a fluid-producing system or its controller (also not shown).

11—Lift Tab [See FIG. 1] (exterior feature of Upper Cap 1 that secures Upper Cap 1 to Lower Housing 3 and is configured for manual engagement to separate Upper Cap 1 from its support by Lower Housing 3, thereafter allowing and/or facilitating rotational movement of Upper Cap 1 relative to Lower Housing 3, and also separation of Upper Cap 1 from Lower Housing 3 when needed)

12—Trip Indicator [See FIG. 3] (connected to Float Assembly 9 and which when Lower Housing is made of transparent material, Trip Indicator 12 includes distinctive coloring, and Float Assembly 9 has tripped positioning, Trip Indicator 12 becomes readily visible through a portion of Lift Tab 11 to conspicuously indicate tripped status of Float Assembly 9 when viewed)

Figure 7:
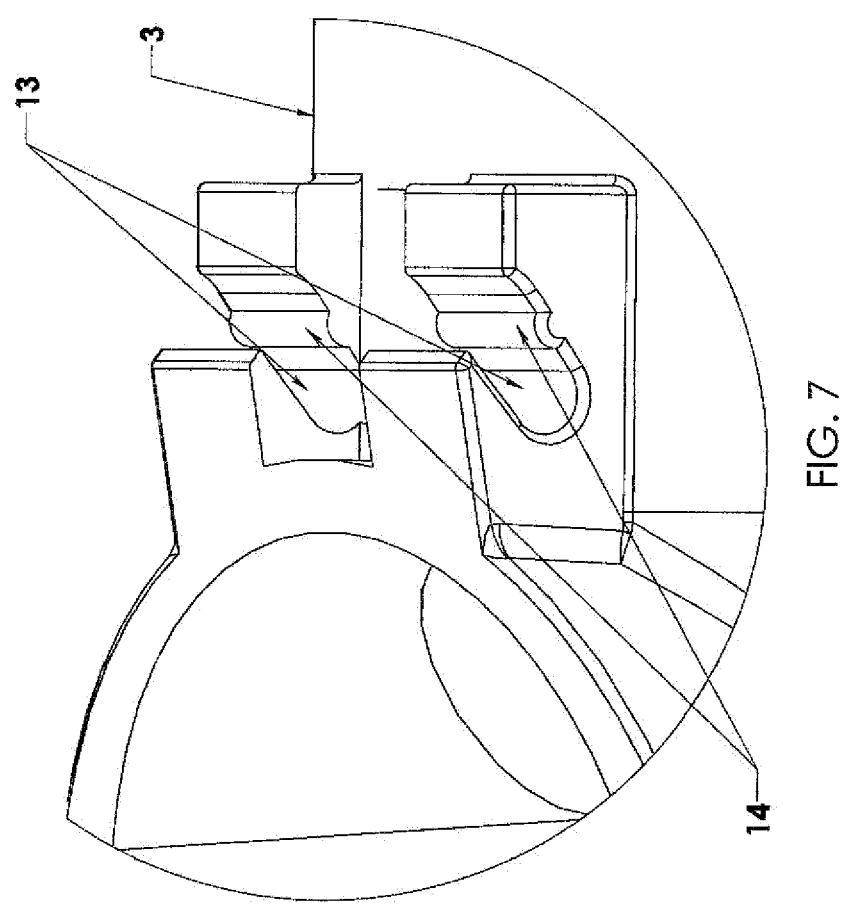
FIG. 7 is an enlarged perspective view from the top of the hinge slots in the lower housing of the present invention in FIGS. 1-6, and shows the hinge slots positioned forwardly from the top front end of the lower housing (below a seal used between the upper cap and the lower housing that is represented in part in FIGS. 3 and 4 by an unnumbered circle positioned slightly to the left and above hinge 4), the hinge slots used to releasably connect the upper cap to the lower housing, and FIG. 7 further identifying the hinge slot snap feature that helps to maintain association of the upper cap to the lower housing, and the angled positioning of the slots in the hinge slot snap feature that deliberately insures a good connection of upper cap to lower housing until intended manual release via sideward movement of the upper cap while in a position fully rotated away from the lower housing.

13—Hinge Slots [See FIG. 7] (located in Lower Housing 3 and used for insertion of Hinge Pin 4 to secure Upper Cap 1 in pivotal relation to Lower Housing 3, their angled configuration helps ensure accurate and secure connection of Upper Cap 1 to Lower Housing 3 during Float Switch 21 operation)

14—Raised Hinge Slot Snap-Lock Feature [See FIG. 7] (located within each Hinge Slot 13 that maintains Hinge Pin 4 securely positioned within Hinge Slots 13 while Upper Cap 1 is closed against Lower Housing 3 during Float Switch 21 operation, and also while Upper Cap 1 is rotating toward and away from Lower Housing 3. It can only be overcome to release Hinge Pin 4 from Hinge Slots 13 when a sideward force is applied to a fully rotated/opened Upper Cap 1 that moves Hinge Pin 4 past the Raised Hinge Slot Snap-Lock Feature 14 and out of Hinge Slots 13)

15—Float Stop [See FIG. 3] (an interior feature of Lower Housing 3 that prevents rearward movement of Float Assembly 9, encouraging only prompt forward rotation of Float Assembly 9 toward its raised tripping point when in contact with fluid so that magnetic attraction can build and overcome the gravitational force on Float Assembly 9 in its lowered pre-tripped position and thereafter lead to the quick and firm snap-locked connection of the Float Magnet 17 in Float Assembly 9 with the Toggle Bar Magnet 18 situated in Upper Cap 1)

16—Fluid Collection Reservoir [See FIG. 4] (positioned in Lower Housing 3 below the rotating Float Assembly 9 and when Lower Housing 3 is made from transparent material, the level of fluid accumulation observed in Fluid Collection Reservoir 16 during air conditioner drain line monitoring applications, in addition to identifying current float positioning, tripped or not, helps an observer identify clogging potential of the associated drain line)

17—Float Magnet [See FIG. 3] (is a part of Float Assembly 9 and moved toward Toggle Bar Magnet 18 until magnetic attraction between them builds and accelerates to place Float Assembly into a raised tripping point goal/position that quickly causes Toggle Bar Magnet 18 to abruptly connect with Float Magnet 17 and create their strongly latched-together and snap-locked positioning)

18—Toggle Bar Magnet [See FIG. 3] (positioned within Upper Cap 1 and moves rapidly via strong magnetic attraction toward Float Magnet 17 once Float Magnet 17 has reached its raised tripping point, thus causing the end of Toggle Bar 19 supporting Toggle Bar Magnet 18 to move abruptly toward Float Magnet 17, the rapid snap-lock action promptly occurring between Magnets 17 and 18 the end of Toggle Bar 19 remote from Magnet 18 to interrupt the continuity of an electrical circuit to which Switch Assembly 10 and a fluid producing system are both connected to stop fluid production)

19—Toggle Bar [See FIG. 3] (supports Toggle Bar Magnet 18, both of which are part of the Switch Assembly 10 located in Upper Cap 1)

20—Magnetic Latching Float Switch Assembly (includes Magnetic Latching Float Switch 21, Tubular Extension 5 securely connected to Lower Housing 3, and Threaded Adapter 6 securely connected to Extension 5 and having an O-ring or other Sealing Means 7 associated with its externally threaded section)

21—Magnetic Latching Float Switch (includes Upper Cap 1, Lower Housing 3, Hinge Pin 4, Switch Assembly 10 situated within Upper Cap 1, and Float Assembly 9 supported by Upper Cap 1 for rotational movement within Lower Housing 3)

22—Pull Piece [See FIG. 3] (optional component made of material subject to magnetic attraction that can be used to assist in maintaining Toggle Magnet 18 in its raised pre-tripped positioning before Float Assembly 9 reaches its raised tripping point goal)

DETAILED DESCRIPTION OF THE INVENTION

The present invention is a magnetic latching float switch 21 made substantially from molded construction and intended to quickly interrupt the continuity of an electrical circuit (not shown) between it and a fluid producing system (not shown), when its float assembly 9 encounters a pre-determined small amount of accumulated fluid (not shown) in a fluid collection reservoir 16 located below float assembly 9 in a lower housing 3, the pre-determined amount of fluid accumulation causing initial movement of float assembly 9 being calculated at a threshold indicating that fluid spillage into surrounding areas could soon occur if operation of the associated fluid-producing system is not promptly shut-off. Magnetic latching float switch 21 can be easily and quickly connected to fluid transport tubing or a secondary opening in a drain pan (not shown) that is in fluid communication with a fluid-producing system, such as but not limited to, a drain pan used under the air handler unit of an air conditioning system to collect moisture removed from circulating air. A tubular extension 5 and a threaded adapter 6 are shown in the accompanying illustrations of the present invention disclosure herein, and in combination with magnetic latching float switch 21 are collectively referred in this disclosure to as magnetic latching float switch assembly 20. Tubular extension 5 and threaded adapter 6 assist secure installation of magnetic latching float switch 21 in a wide variety of work environments, including small work areas, while at the same time permit easy disconnection and reconnection of lower housing 3 for needed maintenance or inspection purposes. Angled geometry of upper cap 1 also assists successful operation of magnetic latching float switch 21 in small work environments. Tubular extension 5 can be securely connected to the open end 3A of lower housing 3 via glue or other bonding means (not shown) to meet building Code requirements where applicable, and threaded adapter 6 has an indent and sealing means combination 7 configured to improve performance of the O-ring or other sealing means used to avoid fluid leakage should overtightening of the threads on adapter 6 occur during magnetic latching float switch 21 installation.

Magnetic latching float switch 21 comprises an upper cap 1, a switch assembly 10 with a toggle bar magnet 18 positioned within upper cap 1, a float assembly 9 connected to upper cap 1 for rotational movement within the hollow interior of a lower housing 3 when lower housing 3 and upper cap 1 are connected together and have fully closed positioning for fluid monitoring operation, wherein lower housing 3 becomes sealed to and supports upper cap 1 in the fully closed position. Float assembly 9 also includes a float magnet 17 sized and positioned to abruptly draw toggle bar magnet 18 in a downwardly direction once the float magnet 17 and its supporting float assembly 9 structure have fully rotated to a predetermined raised tripping point that compels a strong snap-locked latching connection of the two magnets 17 and 18 to one another until manual reset of float assembly 9 from its raised tripping point to its lowered pre-tripped position occurs. In preferred embodiments of the present invention herein, float assembly 9 has angled-geometry, as well as positioning and rotational speed to reach its raised tripping point that are calculated to create the desired rapid and firm snap-action shut-off of a fluid producing system or its controller (not shown) in response to float assembly 9 contact with a small threshold amount of fluid accumulation in the reservoir 16 beneath float assembly 9 that has been pre-determined to indicate a potentially harmful issue relating to operation of the associated fluid-producing system or drain line (not shown) in fluid communication with lower housing 3. When float assembly 9 is in its lowered pre-tripped position, float magnet 17 has initial off-set and out-of-phase positioning relative to the upper toggle bar magnet 18 mounted on one end of a pivotal toggle bar 19 within upper cap 1. Upper toggle magnet 18 is maintained in its run state (shown in FIG. 4) until magnetic attraction between magnets 17 and 18 multiplies sufficiently to rotate float assembly 9 to its raised tripping point (shown in FIG. 3). Once float assembly 9 reaches its calculated raised tripping point, the upper toggle bar magnet 18 drops quickly and sharply in a downwardly direction and becomes firmly locked via magnetic attraction to lower magnet 17, creating a tripped state that shuts off the associated fluid-producing system (not shown). The upper and lower magnets (17, 18) stay firmly in contact with one another until float assembly 9 is manually reset, which can be via a reset pin assembly 2 or by separation of upper cap 1 from lower housing 3 and manually pulling float assembly 9 with its float magnet 17 away from the magnetic influence of toggle bar magnet 18. The dropping toggle bar 19 supported magnet 18 also raises the opposite end of toggle bar 19, the upward movement of which can be spring-assisted (as shown in FIGS. 3 and 4), and in addition to shutting off a fluid-producing system (not shown) may also influence an additional circuit to activate an alarm, remote notification, or other communication or control. What is new and important about the present invention is that magnetic latching float switch assembly 20 provides a multiplication of factors that enhance the strength of the magnetic attraction between toggle bar magnet 18 and float magnet 17 to promptly and reliably shut-off a fluid-producing system (not shown) when issues occur and allow resolution of the issues before fluid damage to surroundings can take place. Thus, the forceful attraction exhibited between upper and lower present invention magnets 17, 18 become multiplied by other structure not present in the prior art, and the stronger magnetic attraction created through this multiplication of factors (and not simply the buoyancy of a lightweight float assembly 9) provides enhanced reliability over prior art fluid sensor devices and shut-off switches for a trouble-free and reproducible/strong snap-locking action between the two magnets 17, 18 and reduced malfunction of magnetic latching float switch 21 during long-term use.

Figure 2:
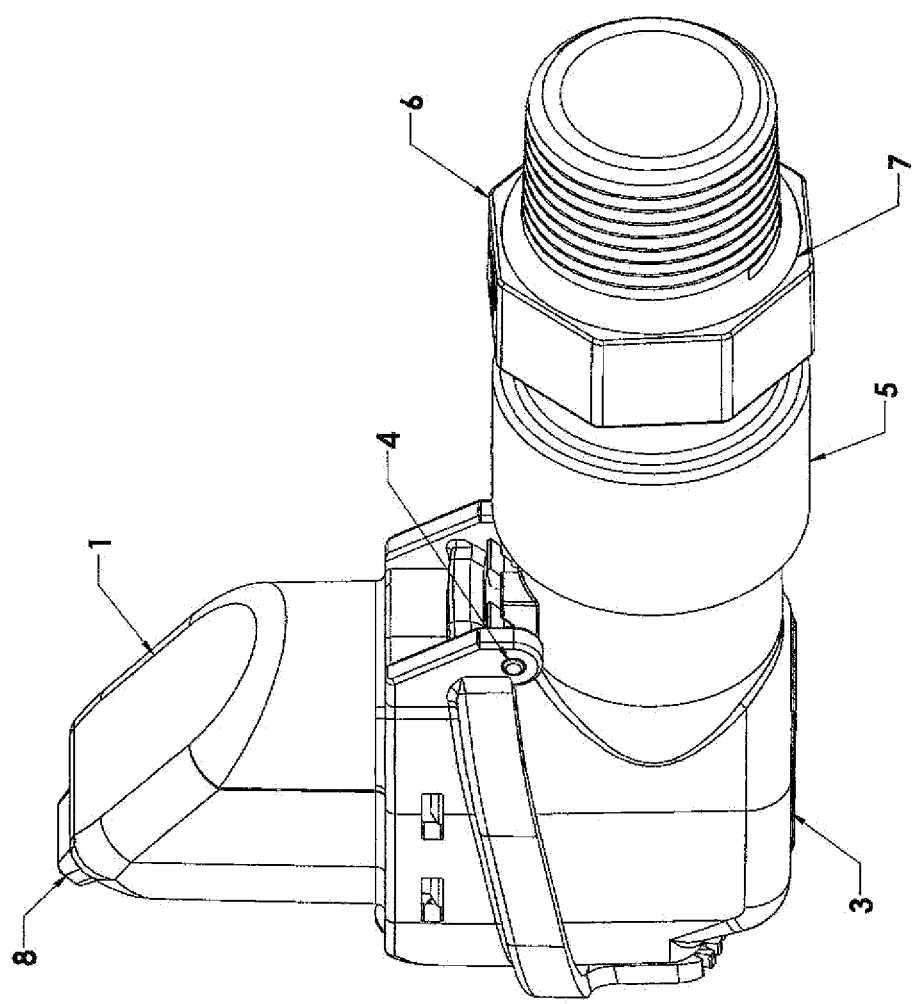
FIG. 2 is a perspective view from the front of the invention in FIG. 1 and further showing an indent where a seal can be secured for improved performance when the present invention assembly is connected to fluid transport tubing or a drain pan (not shown) in fluid communication with a fluid producing system (not shown).
Figure 5:
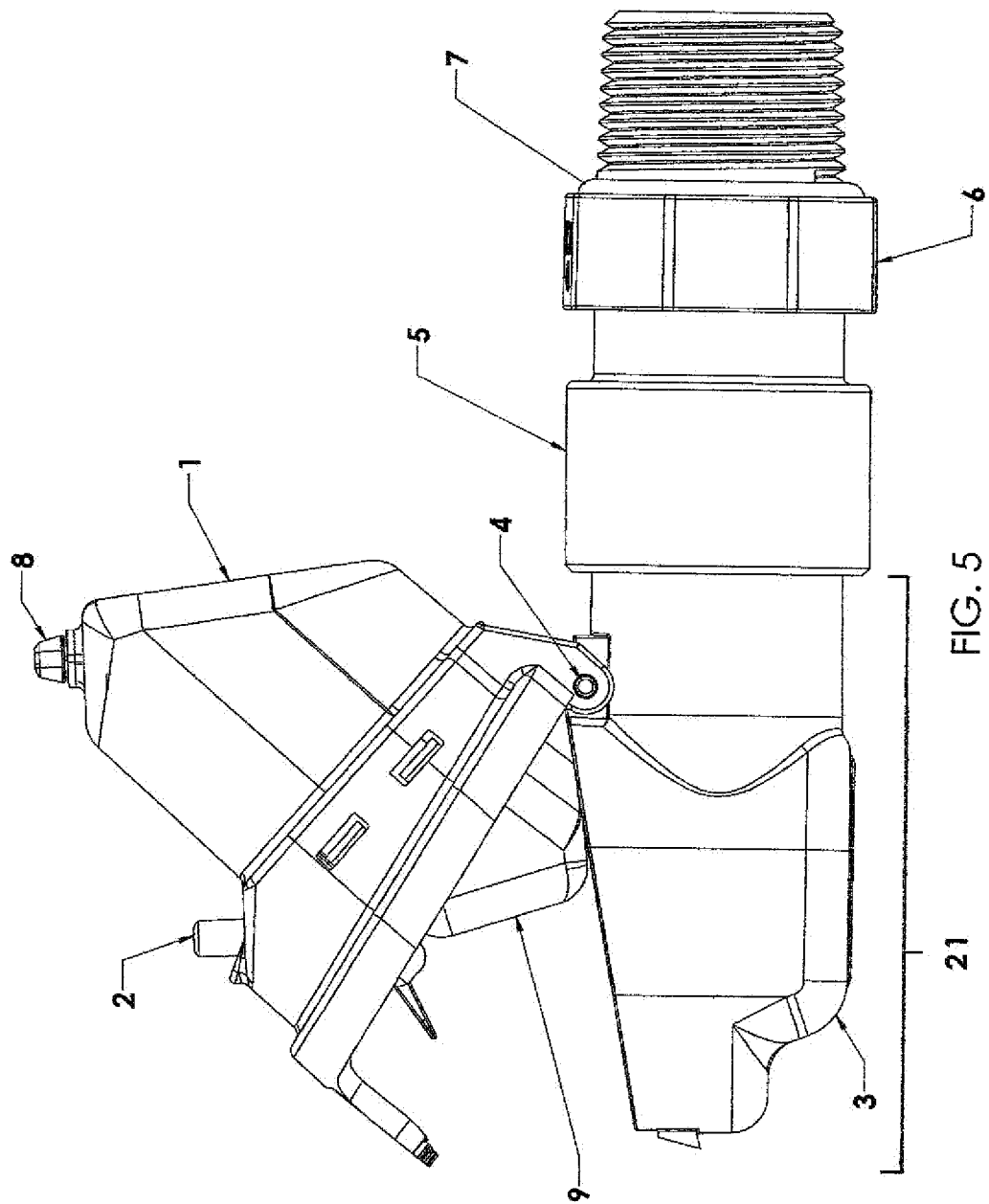
FIG. 5 is a side view of the invention in FIGS. 1-4, which shows the upper cap rotated upwardly away from the lower housing, but still connected to the lower housing via a hinge pin, and the float assembly appearing to be at its raised tripping point.
Figure 6:
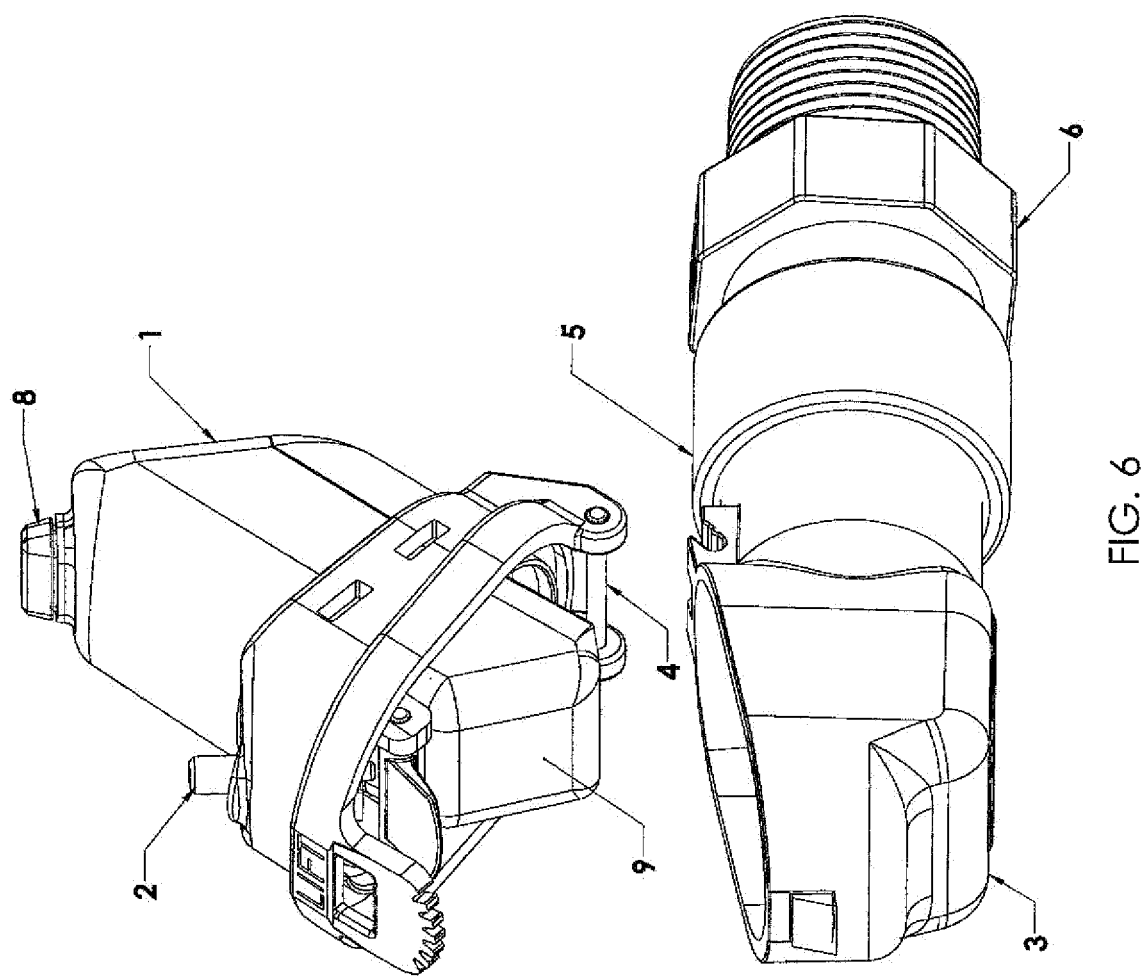
FIG. 6 is a perspective view from the side of the invention in FIGS. 1-5, which shows the upper cap removed from the lower housing while still supporting the rotatable float assembly, and the float assembly ready for manual reset to its lowered pre-tripped position (without use of the reset pin assembly), if desired.

FIGS. 1 and 2 are perspective views respectively from the rear and front of the most preferred embodiment of the present invention magnetic latching float switch assembly 20. FIG. 1 and FIG. 2 both show the angled geometry of its upper cap 1 supported on a lower housing 3, and upper cap 1 rotationally connected to lower housing 3 by a hinge pin 4 that allows upper cap 1 rotation upwardly away from lower housing 3, with or without complete separation of one from the other (as shown in FIGS. 5 and 6). Hinge slot geometry shown in FIG. 7 maintains connection of upper cap 1 to lower housing 3 during full rotation of upper cap 1 away from lower housing 3. It is not until sideward movement/rotation occurs in a fully rotated upper cap 1 that hinge pin 4 is able to move past the raised hinge slot snap-lock feature 14 holding upper cap 1 to lower housing 3 and is then allowed to move out of hinge slots 13, that upper cap 1 can be separated and moved away from lower housing 3. Hinge pin 4 may be integral to upper cap 1, or an independent component. FIGS. 1 and 2 also both show an externally-threaded adapter 6 with a gripping portion having an octagonal shape on one end thereof, and a tubular extension 5 positioned between adapter 6 and lower housing 3. The shape and surface texture of the gripping portion is not critical, as long as its diameter dimension exceeds that of its externally-threaded section to create a sufficiently sized radially-extending surface into which a seal performance-improving indent can be formed. The extension 5 used in association with lower housing 3 is not contemplated to be limited in length dimension to that shown in FIGS. 1 and 2, so that it may assist in adaptation of switch assembly 20 for installation in a variety of work environments. Use of adapter 6 permits easy hand-manipulated detachment and leak-resisting reconnection of float switch 21 (identified in FIG. 5) and extension 5 relative to their installed positions of use. The octagonal configuration of the gripping portion of externally threaded adapter 6 is not contemplated to be limited to that shown in FIGS. 1, 2, 5, and 6, and may have any other configuration and/or surface texture combination facilitating secure attachment and release of the externally-threaded portion of adapter 6 relative to a position of use. Furthermore, preferred thread angle for the externally-threaded section of adapter 6 is 1.75-4 degrees, selected to avoid leaky connections in varying installations where plastic materials of different compositions are used. The rear perspective view shown in FIG. 1 more clearly shows a strain relief 8 situated near the top of upper cap 1 for supporting and stabilizing electrical wiring (not shown) that is part of an electrical circuit the interruption of which stops operation of an associated fluid producing system (not shown). FIG. 1 also identifies preferred positioning of a reset pin assembly 2, the lower end of which is shown in FIGS. 3 and 4 near the pivot axis of float assembly 9 so that when a downward force is manually applied to the upper end of reset pin assembly 2 extending beyond the outer surface of upper cap 1, the resulting short stroke then forces the lower end of reset pin assembly 2 against the pivot axis of float assembly 9, instantly returning float assembly 9 to its lowered pre-tripped position needed for future magnetic latching float switch 21 use. FIG. 1 also shows a lift tab 11 usable for manual separation of upper cap 1 from lower housing 3, which can provide an alternative means of manually resetting float assembly 9 to its lowered pre-tripped position by either pulling on the body of float assembly 9 to rotate it into its lowered pre-tripped position where float magnet 17 no longer seeks magnetic attraction with toggle magnet 18, or by gripping the rotating trip indicator 12 attached to float assembly 9 toward reset pin assembly 2 until float magnet 17 and float assembly reach the lowered pre-tripped position offset from the toggle magnet 18 where magnetic attraction to toggle magnet 18 is minimal. Also as seen in FIG. 1, under the informational marking of the word LIFT, which is preferred but not critical, lift tab 11 may have a transparent window or viewing area through which a brightly colored trip indicator 12 can be viewed to confirm float assembly 9 has reached its raised tripped point. The front view of FIG. 2 reveals one additional structural feature of adapter 6 not visible in FIG. 1, an indent 7 that is adjacent to the externally-threaded portion of adapter 6 and used to improved performance of sealing material, such as an O-ring (see the circle designated by the component number 7 in FIGS. 3 and 4), that is placed in contact with the indent to stabilize positioning of the sealing material during adapter 6 installation for filling in gaps and preventing fluid leaks after the threaded connection is established, with the indent 7 improvement being created in a radially-extending surface between the octagonal gripping portion of adapter 6 and its opposed externally-threaded end. The improved performance provided by the combination of the indent and its associated sealing means 7, is to prevent blowout of O-ring (or other sealing means) 7 used should the molded threads of adapter 6 inadvertently become damaged due to an installer over-tightening them, which frequently occurs.

Figure 4:
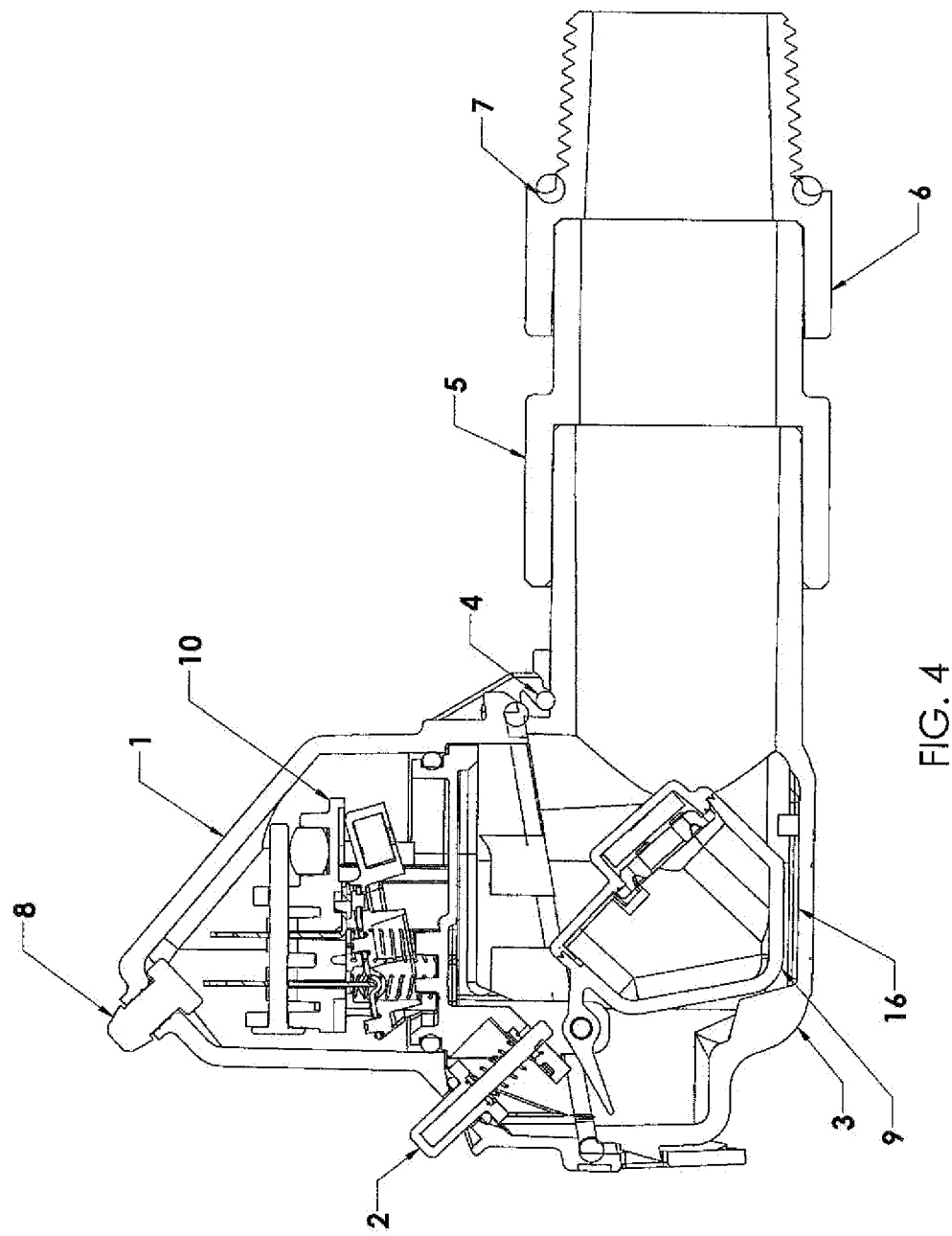
FIG. 4 is a side section view of the invention in FIGS. 1-3 and showing the first and second magnets in a spaced-apart and offset relation with one another in their non-tripped positions, with FIG. 4 also showing the interior portion of the reset pin assembly with its short stroke no longer effective for float movement, pull piece helping to maintain the toggle magnet in its raised pre-tripped positioning, and the back 'float stop' portion of the reservoir in the lower housing positioned against the back part of the float to cause fluid accumulation in the reservoir to only rotate the float in a forward direction toward its raised tripping point.

FIGS. 3 and 4 are side section views of the invention in FIGS. 1 and 2, respectively showing rotatable float assembly 9 in its tripped and starting (pre-tripped) locations. FIG. 3 shows the first and second magnets (17, 18) having tripped positioning and a strong snap-locked/latched magnetically attractive relation with one another, with FIG. 3 also showing the interior portion of the reset pin assembly 2 positioned close to the pivoting axis of the float assembly 9 after strong magnet latching has occurred and the lower end of reset pin assembly 2 ready for manual float assembly 9 reset to its lowered pre-tripped position. FIG. 3 also shows a fluid-trapping reservoir 16 in the bottom of lower housing 3, and the float stop 15 feature of lower housing 3 that is positioned rearward from the direction of float assembly 9 rotation toward its tripping point, and promotes only forward movement of float assembly 9 once it contacts a small amount of accumulated fluid. FIG. 3 further shows lower housing 3 having a hollow interior closely sized for rotation of float assembly 9 and also rotation of an associated trip indicator 12 therein, and an open end 3A of lower housing 3 remote from float stop 15 and in fluid communication with fluid collection reservoir 16. Most often it is contemplated for open end 3A to be tubular, but should not be considered as limited thereto. In addition, FIG. 3 shows trip indicator 12 connected to float assembly 9 which undergoes an orientation change as float assembly 9 moves between its first (reset) and final (tripped) positions so that a brightly colored portion thereof can be viewed through a window or other viewing area (as shown in FIG. 1) in lift tab 11 to confirm tripped positioning of float assembly 9. FIG. 3 also shows preferred structure for the switch assembly 10 located in upper cap 1 that includes a pivoting toggle bar 19 supporting a toggle magnet 18, and an optional pull piece 22 near the angled top portion of upper cap 1 that can be optionally used to assist in biasing/maintaining toggle magnet 18 in its pre-tripped/raised positioning until snap-locked latching connection of magnets 17 and 18 again takes place. Additionally, FIG. 3 shows the open end 3A of lower housing 3 mated with tubular extension 5 and through which fluid (not shown) enters lower housing 3 to reach fluid collection reservoir 16. In contrast, FIG. 4 is a side section view of the invention in FIGS. 1-3 and showing the first and second magnets (17, 18) in a spaced-apart and offset relation with one another in their non-tripped positions (where the magnetic attraction between them is minimal), with FIG. 4 also showing the interior portion of the reset pin assembly 2 with its short stroke no longer effectively positioned for float assembly 9 movement, pull piece 22 helping to bias and maintain the toggle magnet 18 in its raised pre-tripped position, and the float stop 15 in lower housing 3 positioned between reservoir 16 and lift tab 11 (see FIG. 1) that blocks rearward movement of float assembly 9 and permits fluid accumulation in reservoir 16 to only move float assembly 9 in a forwardly direction toward its raised tripping point. FIG. 4 also shows only a very small space between the bottom of fluid collection reservoir 16 and the bottom of rotating float assembly 9 for fluid accumulation that leads to another advantage of the present invention when float assembly 9 is in its lowered pre-tripped position and lower housing 3 is made from transparent material. The level of fluid accumulation observed in fluid collection reservoir 16 during air conditioner drain line monitoring applications, in combination with observer identification of current float positioning (tripped or not), helps to provide an accurate assessment of clogging potential in the associated drain line. For example, through various observations of float status (tripped state, or not) and a visual determination of how much fluid is present in lower housing 3 under float assembly 9, an owner or service technician can accurately identify whether an air conditioning system drain line has a good flow and little clogging potential (float assembly 9 is down/not tripped and no water is visible in lower housing 3), has a small blockage and some clogging potential (float assembly 9 is down/not tripped but a little water is visible in lower housing 3), has a large blockage requiring remedial action (float assembly 9 is up/tripped and a little water is visible in lower housing 3), or total blockage requiring immediate action (float assembly 9 is up/tripped and lower housing 3 is full of water). When up-to-date information about drain line clogging potential is available to home owners and service technicians, impending issues can be resolved early, before damage to a fluid producing system or surroundings can occur.

FIG. 5 and FIG. 6 show views of magnetic latching float switch assembly 20 with upper cap 1 separated from lower housing 3 to reveal the presence of float assembly 9 connected to upper cap 1 for rotational movement within lower housing 3. FIG. 5 is a side view of the invention in FIGS. 1-4, which shows upper cap 1 rotated upwardly away from lower housing 3, still associated with the hinge slots 13 in lower housing 3 via hinge pin 4 but not having fully opened positioning, and further showing float assembly 9 appearing to have tripped positioning. FIG. 6 is a perspective view from the rear of the invention in FIGS. 1-5, and shows magnetic latching float switch assembly 20 with its hinge pin 4 still associated with upper cap 1, but in a position above lower housing 3 and no longer connected to lower housing 3. Neither hinge pin 4, nor upper cap 1, have any association with the hinge slots 13 (see FIG. 7) in lower housing 3. With separation of upper cap 1 from lower housing 3, manual access to float assembly 9 is available for manual reset (without the use of reset pin assembly 2), if desired. FIG. 7 is an enlarged perspective view from the top of the hinge slots 13 in lower housing 3 of the present invention in FIGS. 1-6, and shows hinge slots 13 positioned forwardly from the top front end of lower housing 3 (below a seal used between upper cap 1 and lower housing 3 that is represented in part in FIGS. 3 and 4 by an unnumbered circle positioned slightly to the left and above hinge 4), the hinge slots 13 used to releasably connect upper cap 1 to lower housing 3. FIG. 7 further identifies the raised hinge slot snap-lock feature 14 that helps to maintain an association of upper cap 1 to lower housing 3, and also shows the angled structure of slots 13, wherein the raised hinge slot snap-lock feature 14 maintains a good connection of upper cap 1 to lower housing 3 even when upper cap 1 is fully rotated away from lower housing 3, wherein upper cap 1 can only be released from lower housing 3 by sideward motion of a fully rotated upper cap 1 that allows hinge pin 4 to move over the raised hinge slot snap-lock feature 14 and be withdrawn out of hinge slots 13. Raised hinge slot snap-lock feature 14 helps to maintain good and secure association of upper cap 1 to lower housing 3 until intentional manual release, thereby preventing unexpected separation of upper cap 1 from lower housing 3 during attempts to reset float assembly 9 to its lowered pre-tripped position.

In addition, the most preferred embodiments of the present invention are made from plastic material and molded construction, but are not considered as limited to such material, as long as the present invention can meet all objectives associated with an installation site needed for long-term and reliable performance in shutting off a fluid-producing system when needed to prevent damage from excess fluid accumulation. The rotational speed and trip point present invention float assembly 9 are adjustable via multiple factors, such as but not limited to the amount of off-center angle in its float geometry, the amount of forward float angle positioning for float assembly 9 relative to a vertical positioning, the buoyancy used for float assembly 9, and the size, weight, and positioning of the opposed magnets 17 and 18 used to quickly raise float assembly 9 and create the fast-snapping tripping movement of toggle bar 19 that triggers the abrupt latching connection of magnets 17 and 18 firmly together opens a circuit to shut off production of additional fluid and avoid damage to the system or its surroundings. It is this fast-snapping action of magnets 17 and 18 together that overcomes the upward force directed to pivoting toggle bar 19 by at least one spring (shown as a part of assembly 10, but not given an independent numerical designation), and then creates the tripped state that shuts off power to an associated fluid-producing system, appliance, or controller, and/or sends remote communication (not shown). Return of the upper/toggle magnet 18 to the reset position can be via one or more coil springs positioned below toggle bar 19 illustrated as a part of assembly 10 in FIGS. 3 and 4, but not given an independent numerical designation), via magnetic attraction of upper/toggle magnet 18 to a pull piece 22 positioned above it (such as but not limited to a ferrous pin or other material influenced by magnetic attraction that is shown in FIG. 3), and/or other similar or equivalent means securely maintaining the toggle magnet 18 in a run position until increasing magnetic attraction of the moving float magnet 17 when it reaches the raised tripping point again causes toggle magnet 18 to move downward and into a strong latched/locked magnetic engagement with float magnet 17. Thus, in a non-tripped/run state, a coil spring (shown in accompanying illustrations, but not given independent numerical designation) and/or ferrous pin (such as pull piece 22) in combination, or other means is used to raise and bias the end of toggle bar 19 supporting the upper magnet 18 away from lower housing 3, and is successful in doing so while the lower float magnet 17 is rotated away from (and out of alignment with) upper toggle magnet 18. The forceful attraction exhibited between present invention upper and lower magnets (18, 17) is multiplied by other structure not present in the prior art, and the stronger magnetic attraction created through a multiplication of factors, (and not simply the buoyancy of a small, compact, and lightweight float assembly 9) provides enhanced reliability over prior art signaling fluid-sensor devices and shut-off switches, for a trouble-free and reproducible/strong snap-locking action between the two magnets (17 and 18) and reduced switch malfunction during long-term damage avoidance use. In addition, although the most preferred embodiments of the present invention magnetic latching float switch assembly 20 have a transparent lower housing 3 through which a tripped float status is easily viewed, tripped status may also (or in the alternative, and although not shown) be indicated by a notification light, LED, or other indicator associated with a readily accessible manual reset button that is advantageous to an installation site. Another advantage provided by use of the present invention relates to the easily releasable press-fit engagement between its upper cap 1 and lower housing 3 via hinge slots 13. Easy removal of upper cap 1 can quickly be accomplished, with the low-profile lower housing 3 then able to be easily rotated relative any connected the tubing or drain pan (even in small work areas) to separate lower housing 3 from it for inspection, testing, maintenance, and/or repair or replacement purposes. Furthermore, the most preferred embodiments of the present invention switch may be configured as a single throw switch or a double throw switch.

While the written description of the invention herein is intended to enable one of ordinary skill to make and use its best mode, it should also be appreciated that the invention disclosure only provides examples of specific embodiments and methods, and many variations, combinations, and equivalents also exist which are not specifically mentioned. The present invention should therefore not be considered as limited to the above-described embodiments, methods, and examples, but instead encompassing all embodiments and methods identified in the accompanying claims, and also within the scope and spirit of the invention.

I claim:

1. A magnetic latching float switch assembly used in an electrical circuit with a fluid-producing system to abruptly and definitively interrupt an electrical circuit for shut-off of the fluid-producing system until restoration of a continuity of the electrical circuit is accomplished by a manual reset of said magnetic latching float switch assembly, the electrical circuit interruption occurring when said magnetic latching float switch assembly detects an amount of fluid produced by the fluid-producing system predetermined to be a risk for a damage to the fluid-producing system or its surroundings, said magnetic latching float switch assembly comprising:

an upper cap having a switch assembly comprising a toggle bar with opposing ends positioned for repetitive pivoting movement within said upper cap, a toggle bar magnet supported by one of said opposing ends for movement between raised pre-tripped positioning and lowered tripped positioning, and a float assembly rotationally connected to said upper cap for movement between a lowered pre-tripped position and a raised tripping point, said float assembly comprising a float magnet, said toggle bar magnet in said raised pre-tripped positioning and said float magnet in said lowered pre-tripped position offset from one another, minimizing magnetic attraction therebetween;

a lower housing configured for support of said upper cap and disconnection from said upper cap, said lower housing having a hollow interior with an open end, said hollow interior sized and configured for rotational movement of said float assembly therein between said lowered pre-tripped position and said raised tripping point, said lower housing also configured with a bottom fluid collection reservoir in fluid communication with said open end; and a connection means located between said upper cap and said lower housing, adapted to provide a secure connection between said upper cap and said lower housing for unobstructed rotation of said float assembly within said hollow interior of said lower housing, said connection means also adapted to allow rotational movement of said upper cap relative to said lower housing between a fully closed position and a fully open position where said float assembly is exposed and available for manual manipulation from said raised tripping point position to said lowered pre-tripped position, as well as said connection means further adapted to allow rotational movement of said upper cap from said fully closed position to positions between said fully closed and said fully open positions while concurrently preventing release and separation of said upper cap from said lower housing, wherein when a fluid enters said reservoir through said open end of said lower housing and accumulates beyond the amount of fluid predetermined to be a risk for damage to the fluid-producing system or its surroundings, contact of the fluid that is accumulated in said reservoir with said float assembly causes a rotation of said float assembly from said lowered pre-tripped position toward said raised tripping point, and thereafter increasing magnetic attraction between said toggle bar magnet and said float magnet further multiplies as said float magnet continues movement closer to said toggle bar magnet, and when said float magnet reaches said raised tripping point, multiplied magnetic attraction between said toggle bar magnet and said float magnet abruptly and pulls said toggle bar magnet in a downwardly direction toward said float magnet while said float magnet remains at said raised tripping point, causing a snap-locked latching magnetic connection of said toggle bar magnet and said float magnet together until said magnetic connection ends by a manual reset of said float assembly to said lowered pre-tripped position, said manual reset recreating said offset positioning between said float magnet and said toggle bar magnet, minimizing magnetic attraction therebetween and allowing a repeat use of said magnetic latching float switch assembly for said fluid-producing system shut-off should fluid accumulation in said reservoir again reach said predetermined threshold amount.

2. A device comprising:
a threaded portion;
a first housing coupled to the threaded portion,
a second housing pivotally coupled to the first housing such that the second housing is configured to pivotally move relative to the threaded portion and the first housing between a first position and a second position;
a float hosting a first magnet, wherein the second housing pivotally houses the float such that the float is configured to pivotally move relative to the threaded portion, the first housing, and the second housing between a third position and a fourth position; and
a toggle hosting a second magnet, wherein the second housing hosts the toggle, wherein the threaded portion is configured to thread with a port of a pan configured to receive a liquid such that the liquid urges the float to pivotally move relative to the threaded portion, the first housing, and the second housing from the third position to the fourth position while the second housing is positioned in the first position such that the first magnet is attracted to the second magnet when the liquid enters the first housing from the threaded portion as input from the pan via the port, wherein the float is configured to avoid contact with the liquid in the first housing when the second housing is positioned in the second position and the liquid enters the first housing from the threaded portion as input from the pan via the port.

3. The device of claim 2, wherein the first housing includes a transparent portion such that the liquid is visible in the first housing through the transparent portion when the liquid enters the first housing from the threaded portion as input from the pan via the port.

4. The device of claim 2, wherein the second housing includes a dry portion, wherein the toggle extends in the dry portion.

5. The device of claim 4, further comprising:
a wire extending from the dry portion outside the second housing, wherein the wire is configured to electrically couple to an electrical load outside of the threaded portion, the first housing, and the second housing and enabling the liquid outside of the threaded portion, the first housing, and the second housing such that the electrical load enables the liquid when the second housing is positioned in the first position and the float is positioned in the third position and controlled when the float is positioned in the fourth position when the liquid enters the first housing from the threaded portion as input from the pan via the port.

6. The device of claim 5, wherein the electrical load does not enable the liquid when the float is positioned in the fourth position when the threaded portion is threading with the port of the pan configured to receive the liquid and the wire is electrically coupled to the electrical load.

7. The device of claim 2, further comprising:
a spring positioned within the second housing, wherein the spring engages the toggle.

8. The device of claim 2, wherein the toggle moves within the second housing relative to the second housing toward the float based on the second magnet being attracted to the first magnet when the liquid urges the float to pivotally move relative to the second housing from the third position to the fourth position such that the first magnet is attracted to the second magnet when the liquid enters the first housing from the threaded portion as input from the pan via the port.

9. The device of claim 2, further comprising:
a plurality of electrical contacts extending within the second housing, wherein the electrical contacts are configured to alternately contact the toggle depending on how the toggle is positioned within the second housing based on the float being positioned in the first position or the second position.

10. The device of claim 9, wherein the toggle extends between the float and the electrical contacts.

11. The device of claim 2, further comprising:
a material positioned within the second housing, wherein the material attracts the second magnet when the float is positioned in the third position.

12. The device of claim 11, wherein the toggle extends between the float and the material.

13. A method comprising:
causing a user to access a device, wherein the device includes a threaded portion, a first housing, a second housing, a float, and a toggle, wherein the first housing is coupled to the threaded portion, wherein the second housing is pivotally coupled to the first housing such that the second housing is configured to pivotally move relative to the threaded portion and the first housing between a first position and a second position, wherein the float is hosting a first magnet, wherein the second housing pivotally houses the float such that the float is configured to pivotally move relative to the threaded portion, the first housing, and the second housing between a third position and a fourth position, wherein the toggle is hosting a second magnet, wherein the second housing hosts the toggle; and causing the user to thread the threaded portion with a port of a pan configured to receive a liquid such that the liquid urges the float to pivotally move relative to the threaded portion, the first housing, and the second housing from the third position to the fourth position while the second housing is positioned in the first position such that the first magnet is attracted to the second magnet when the liquid enters the first housing from the threaded portion as input from the pan via the port, wherein the float is configured to avoid contact with the liquid in the first housing when the second housing is positioned in the second position and the liquid enters the first housing from the threaded portion as input from the pan via the port.

14. The method of claim 13, wherein the first housing includes a transparent portion such that the liquid is visible in the first housing through the transparent portion when the liquid enters the first housing from the threaded portion as input from the pan via the port.

15. The method of claim 13, wherein the second housing includes a dry portion, wherein the toggle extends in the dry portion.

16. The method of claim 15, wherein the device includes a wire extending from the dry portion outside the second housing, and further comprising:

causing the wire to electrically couple to an electrical load outside of the threaded portion, the first housing, and the second housing and enabling the liquid outside of the threaded portion, the first housing, and the second housing such that the electrical load enables the liquid when the second housing is positioned in the first position and the float is positioned in the third position and controlled when the float is positioned in the fourth position when the liquid enters the first housing from the threaded portion as input from the pan via the port.

17. The method of claim 16, wherein the electrical load does not enable the liquid when the float is positioned in the fourth position when the threaded portion is threading with the port of the pan configured to receive the liquid and the wire is electrically coupled to the electrical load.

18. The method of claim 13, wherein the device includes a spring positioned within the second housing, wherein the spring engages the toggle.

19. The method of claim 13, wherein the toggle moves within the second housing relative to the second housing toward the float based on the second magnet being attracted to the first magnet when the liquid urges the float to pivotally move relative to the second housing from the third position to the fourth position such that the first magnet is attracted to the second magnet when the liquid enters the first housing from the threaded portion as input from the pan via the port.

20. The method of claim 13, wherein the device includes a plurality of electrical contacts extending within the second housing, wherein the electrical contacts are configured to alternately contact the toggle depending on how the toggle is positioned within the second housing based on the float being positioned in the first position or the second position.

21. The method of claim 20, wherein the toggle extends between the float and the electrical contacts.

22. The method of claim 13, wherein the device includes a material positioned within the second housing, wherein the material attracts the second magnet when the float is positioned in the third position.

23. The method of claim 22, wherein the toggle extends between the float and the material.

24. A method comprising:

supplying a device to an end user, wherein the device includes a threaded portion, a first housing, a second housing, a float, and a toggle, wherein the first housing is coupled to the threaded portion, wherein the second housing is pivotally coupled to the first housing such that the second housing is configured to pivotally move relative to the threaded portion and the first housing between a first position and a second position, wherein the float is hosting a first magnet, wherein the second housing pivotally houses the float such that the float is configured to pivotally move relative to the threaded portion, the first housing, and the second housing between a third position and a fourth position, wherein the toggle is hosting a second magnet, wherein the second housing hosts the toggle; and causing the end user to thread the threaded portion with a port of a pan configured to receive a liquid such that the liquid urges the float to pivotally move relative to the threaded portion, the first housing, and the second housing from the third position to the fourth position while the second housing is positioned in the first position such that the first magnet is attracted to the second magnet when the liquid enters the first housing from the threaded portion as input from the pan via the port, wherein the float is configured to avoid contact with the liquid in the first housing when the second housing is positioned in the second position and the liquid enters the first housing from the threaded portion as input from the pan via the port.

\* \* \* \* \*